United States Patent [19]

Franks

[11] Patent Number: 4,737,275
[45] Date of Patent: Apr. 12, 1988

[54] RESIN PRESSURE SENSOR FOR WATER TREATMENT

[75] Inventor: Jeffrey G. Franks, Greenfield, Wis.

[73] Assignee: Autotrol Corporation, Milwaukee, Wis.

[21] Appl. No.: 836,702

[22] Filed: Mar. 6, 1986

[51] Int. Cl.$^4$ .............................................. B01J 47/14
[52] U.S. Cl. ......................................... 210/91; 73/741; 210/93; 210/96.1; 210/190
[58] Field of Search .................. 210/96.1, 97, 91, 139, 210/140, 190, 191, 350, 90, 93, 143; 73/741-743

[56] References Cited

U.S. PATENT DOCUMENTS

| | | | |
|---|---|---|---|
| 3,250,392 | 5/1949 | Luck | 210/96.1 |
| 3,479,864 | 11/1969 | Patterson | 73/64.3 |
| 3,574,330 | 4/1971 | Prosser | 210/96 |
| 3,839,901 | 10/1974 | Finkle et al. | 73/54 |
| 4,158,628 | 6/1979 | Fleckenstein | 210/96.1 |
| 4,332,678 | 6/1982 | Spiegl | 210/86 |
| 4,385,992 | 5/1983 | Clauer et al. | 210/662 |

OTHER PUBLICATIONS

Chemical Engineering, Jun. 12, 1961, pp. 115 and 116.
Data Instrument, Inc. Engineering Data Sheet.
pp. 100–102, 107, 109–112, 115 and 509–511 from a McGraw Book Company Publication (1962) authored by Friedrich Helfferich entitled "Ion Exchange".

*Primary Examiner*—Ivars Cintins
*Attorney, Agent, or Firm*—Quarles & Brady

[57] ABSTRACT

An improved resin sensor which senses a change in the condition of the resin by forces acting on a receptacle for the resin. The sampling resin is utilized to indicate a change of ion or equilibrium condition of the resin when employed as an indicator for resin regeneration or end of a rinse cycle in a water softening or deionization system. The sampling resin is placed in a receptacle which will confine the expansion in volume of the resin as the resin is acted upon by a sampling or indicator liquid causing the resin to exert a force on the receptacle. The receptacle for the resin allows water to freely flow in and out while entrapping the resin therein. In one embodiment, the container is composed of screened walls and the pressure sensor is a strain gauge which is attached thereto. In another embodiment, the pressure sensor is the container and in the form of a multiapertured Bourdon tube in a fluid compartment. In both embodiments, the pressure sensor will measure the change in internal pressure of the resin as it is contacted by an indicator liquid. In utilizing the resin pressure as an indication of resin regeneration or depletion, a more accurate determination can be made. Further, by employing a sensor container in a compartment water pressure is equalized and pressure differentials for the water inside and outside of the container do not have to be compensated.

24 Claims, 5 Drawing Sheets

FIG 7
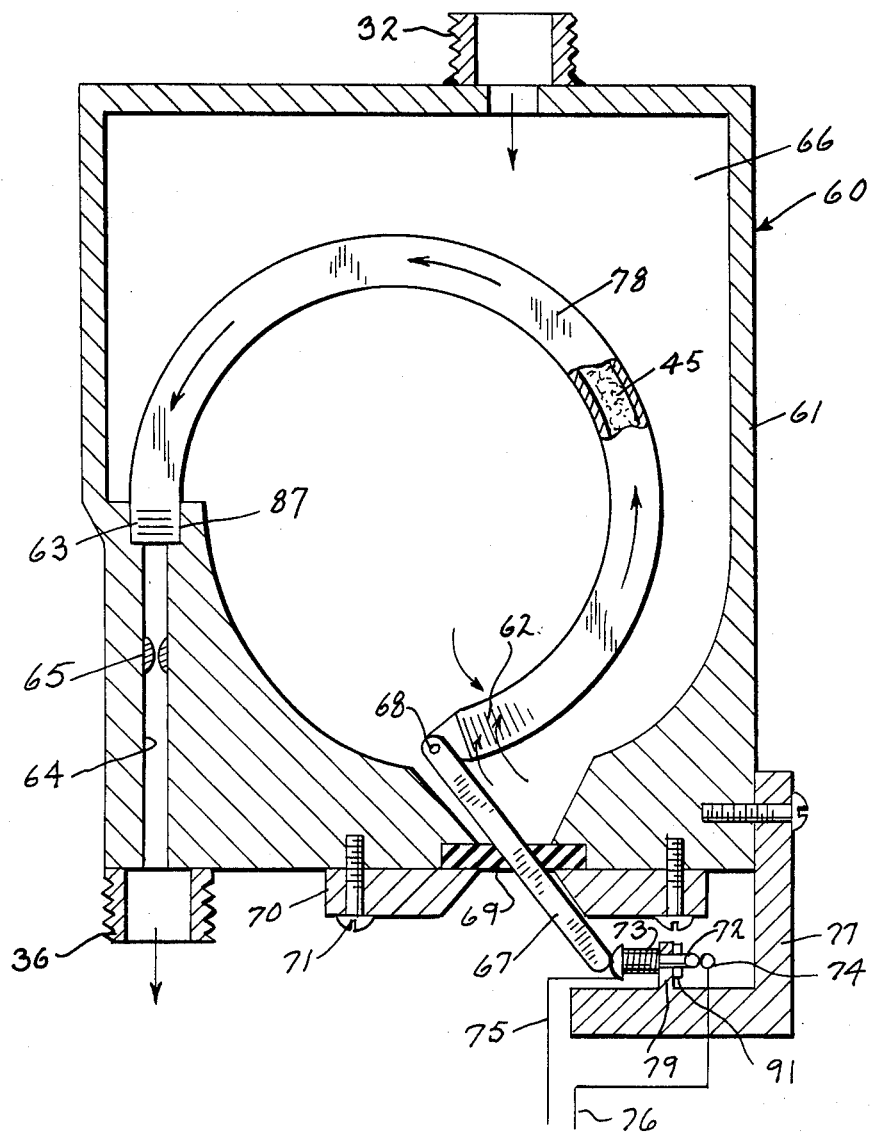
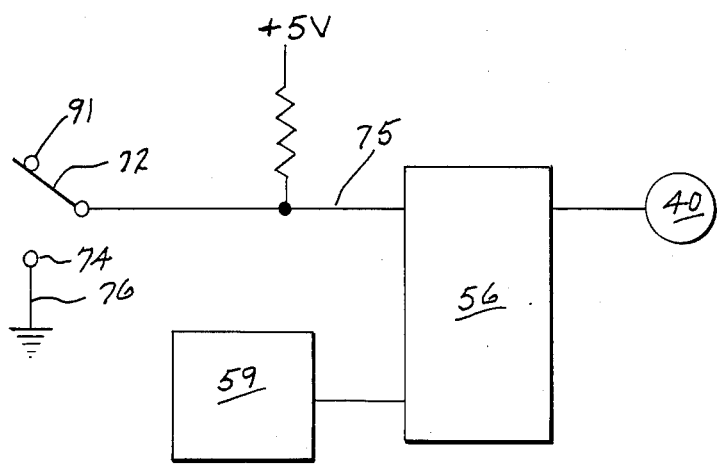
FIG. 8

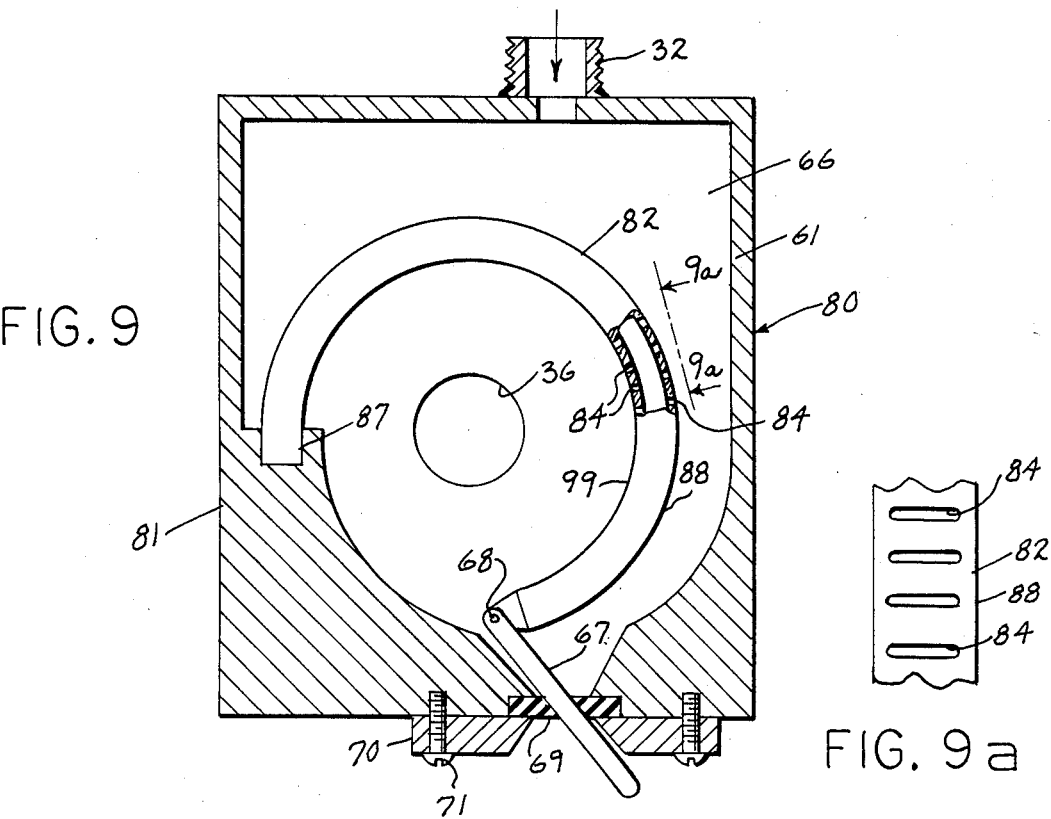
FIG. 9
FIG. 9a
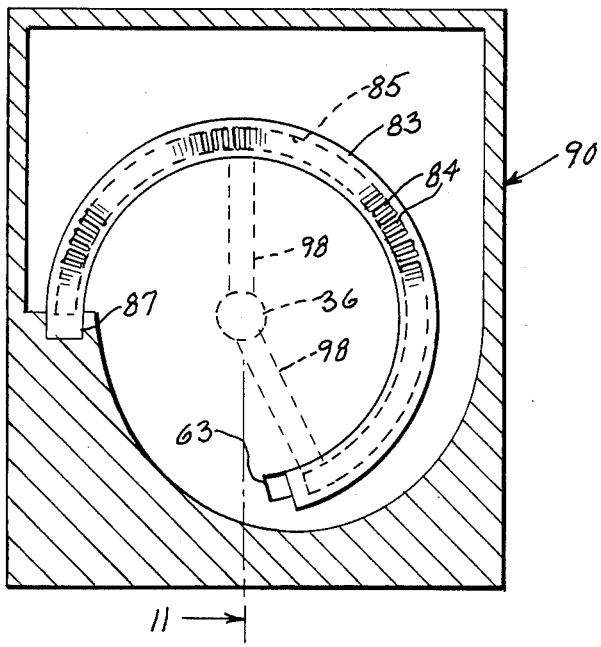
FIG. 10
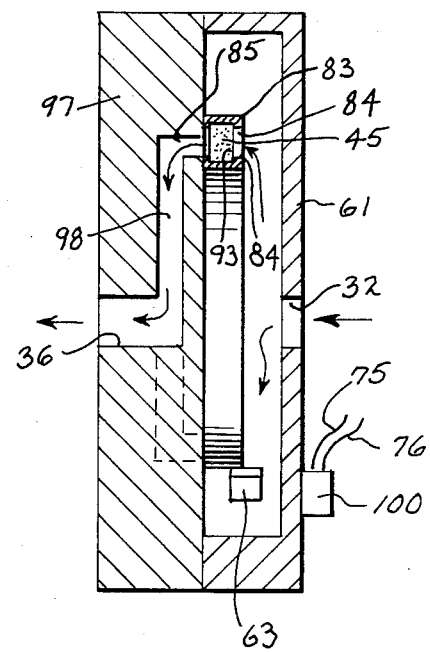
FIG. 11

RESIN PRESSURE SENSOR FOR WATER TREATMENT

BACKGROUND OF THE INVENTION

This invention relates generally to a resin sensor for water treatment, and more particularly to an improved automatic control for the regeneration of a water softener wherein the pressure of the resin is sensed to determine when regeneration should be effected.

As indicated in U.S. Pat. No. 4,385,992 assigned to the assignee of this application, there are several different approaches to the control of the regeneration of water softener resin. An example of an automatic sensing water softener control is found in U.S. Pat. No. 3,574,330 also assigned to the assignee of this application. These previously mentioned U.S. patents as well as U.S. Pat. Nos. 4,332,678 and 3,479,864 rely on measuring resin expansion by means of swelling of the resin in a chamber which will permit some type of resin expansion. In the one embodiment in U.S. Pat. No. 3,479,864 where a Bourdon tube is employed, there is no consideration for eliminating differences in water pressure from the resin pressure measured. In U.S. Pat. Nos. 3,574,330 and 4,385,992 a sampling cell is provided wherein the resin is allowed to expand upon regeneration and to contract upon depletion, and a plunger in the cell is permitted to extend inwardly to sense the volume of the resin.

In contrast, the sensor of this invention does not sense the resin volume expansion but instead confines the resin in a container from which the resin pressure is measured by its force on the container.

SUMMARY OF THE INVENTION

In accordance with the invention, there is provided an automatic sensor for a fluid treatment device wherein a fluid treatment container is provided for receiving a fluid. A first quantity of resin is contained in the container for contact with the fluid for changing the condition of the fluid. A second quantity of resin is in fluid communication with the first quantity of resin. Receptacle means confine the second quantity of resin in an enclosed volume so that any attempted expansion in volume of the resin is restrained in all directions. At the same time the receptacle means are placed in a fluid compartment for the fluid so fluid pressure is free to act inside as well as outside the receptacle means to self compensate for fluid pressure. A sensor means is operatively associated with the receptacle means to provide a further effect such as a mechanical or electrical effect, varying in accordance with the resin pressure acting on the internal receptacle means to effect a force caused by a change of condition by the resin. When the sensor is utilized to sense hard water in a softener bed, the internal force caused by the resin pressure upon the receptacle means will be altered by the ion exchange resin changing to a reduced stress on the receptacle means as the exposure to a sample of hard water is increased. When the sensor is employed to sense the rinse water, the force upon the receptacle means will be altered by the resin changing from a low stress on the receptacle means when in equilibrium with high concentrations of brine such as containing sodium chloride to a high stress condition when fully rinsed. In one embodiment, the pressure sensor means is defined by a strain gauge which is connected to the receptacle means which is in the form of a container composed of screened walls. In another embodiment, the pressure sensor means and the receptacle means are embodied in a multiapertured Bourdon tube which will allow liquid to pass into the Bourdon tube, for contact with the resin, as well as out of it. The strain gauge or the Bourdon tube can be connected to circuit means which is interconnected to means to trigger an output for regenerating the ion exchange resin in the fluid treatment container when the pressure sensor registers a predetermined state of condition of the fluid. The Bourdon tube can have a lever arm connected thereto as a signal indication means of movement of the Bourdon tube. In one instance it can control an electrical switch or the lever arm can be employed to mechanically or hydraulically initiate a regeneration cycle. In one embodiment the pressure sensor is located outside of the fluid treatment container and connected thereto by a sampling liquid carrying conduit. In another embodiment the liquid carrying conduit is in communication with the receptacle means by a valved sampling tube. In still another embodiment, the liquid carrying conduit is connected to valving means which controls the rinse cycle and the pressure sensor is mounted in fluid communication with a drain conduit so as to sense the rinse water as an indicator liquid.

It is an advantage of the present invention to provide an improved apparatus for sensing when a resin bed has been depleted so that proper regeneration of the sensor resin and the resin in the main treatment bed is effected.

It is an additional advantage of this invention to provide an improved apparatus for sensing when regeneration of the resin is complete as a water saving feature.

It is another advantage of this invention to provide an apparatus of the foregoing type wherein a stronger and more stable resin can be employed as the sensor resin.

Still another advantage is an apparatus of the foregoing type wherein the sensor apparatus is of a simplified construction and will self compensate for water pressure differentials.

Yet another advantage is a sensor device for a water treating resin bed wherein piston or plunger type components are obviated.

Still other advantages are an apparatus of the foregoing type where the apparatus can be manufactured at a minimum of cost.

The foregoing and other advantages of the invention will appear in the following detailed description. In the description, reference is made to the accompanying drawings which illustrate the preferred embodiments of the invention.

BRIEF DESCRIPTION OF THE DRAWINGS

FIG. 7 is a view in vertical section of an alternative embodiment of a sensor device;

FIG. 8 is a schematic view illustrating the sensor device of FIG. 7 interconnected to a microprocessor for purposes in initiating regeneration of a water softener;

FIG. 9 is a view similar to FIG. 7 illustrating still another embodiment of a sensor;

FIG. 9a is a view in horizontal section taken along line 9a—9a of FIG. 9;

FIG. 10 is a view similar to FIG. 7 showing yet another embodiment of a sensor;

FIG. 11 is a view in vertical section taken along line 11—11 of FIG. 10;

DETAILED DESCRIPTION OF THE EMBODIMENTS

Figure 1:
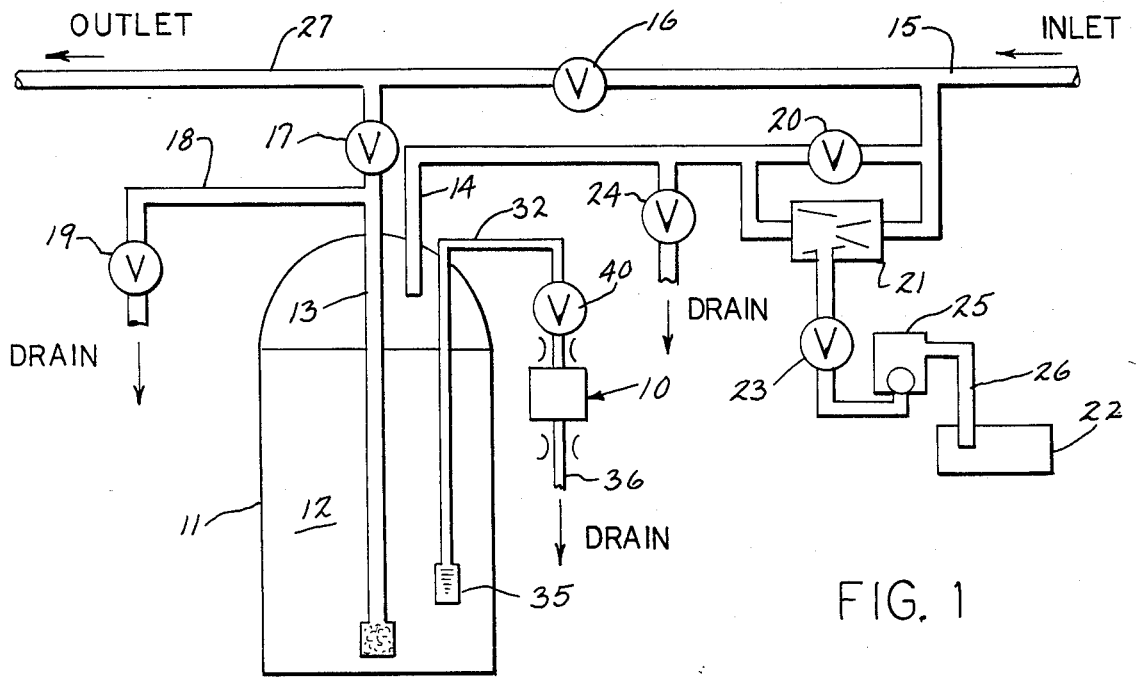
FIG. 1 is a schematic view of a system for regenerating a water softener including one embodiment of the sensor of this invention.

Referring to FIG. 1, the sensor generally 10 is employed in conjunction with existing water softener apparatus having components of the type illustrated and described in the aforementioned U.S. Pat. No. 3,574,330. The apparatus includes a softening tank 11 which contains a bed 12 of ion exchange resin. An outlet tube 13 extends through the bed 12 from a point adjacent the bottom of the bed. An inlet pipe 14 extends into the softener tank 11 and has its discharge opening above the level of the bed 12. Raw water is delivered through an inlet line 14 and treated water is delivered through a service line 27. The inlet line 15 and service line 27 may be connected through a normally closed valve 16. A second service valve 17 is normally open and is interposed between the outlet tube 13 and the service line 27. A drain line 18 containing a normally closed drain valve 19 also extends from the outlet tube 13.

Raw water can be delivered to the inlet pipe 14 through a service inlet valve 20. Alternatively, the raw water entering the inlet line 15 can pass through a brine injector 21 to draw brine from a brine tank 22 when a brine inlet valve 23 is open and when the service inlet valve 20 is closed, drain valve 19 is open and service valve 17 is closed. The withdrawn brine will be delivered to the inlet pipe 14 of the softener. The inlet pipe 14 is also connectable to a drain through a second normally closed drain valve 24.

During service operation, the drain valves 19 and 24, the first service valve 16 and the brine inlet valve 23 would all be closed while the second service valve 17 and the service inlet valve 20 would both be open.

Raw water will then flow from the inlet line 15 through the inlet pipe 14 onto the top of the resin bed 12. The water will pass through the bed 12 and treated water will be withdrawn from the bottom of the bed 12 through the outlet tube 13 to the service line 27.

Regeneration

The bed 12 will eventually become exhausted. In the typical softening process this means that the resin bed 12 has changed from a sodium to a calcium, magnesium condition. To regenerate the bed 12, a control will first close the service inlet valve 20 and open the first service valve 16 and the second drain valve 24. Raw water from the inlet line 15 can then be fed through the outlet tube 13 to backwash the resin 12 with the backwash water exiting through the inlet pipe 14 to drain through the now open second drain valve 24. Water is continued to be supplied to the service line 27 at this time even though it is not being treated.

The backwash is followed by a brining and rinse. For this operation the second service valve 17 and the second drain valve 24 would be closed while the brine inlet valve 23 and the first drain valve 19 are opened. Raw water would then be forced through the injector 21 and brine would be drawn from the brine tank 22 through a brine line 26, an air check valve 25 and the open brine valve 23 and would be discharged into the tank through the inlet pipe 14. The brine will pass through the resin bed 12 and will exit to drain through the outlet tube 13 and the now open first drain valve 19. When the contents of the brine tank 22 has been exhausted, the air check valve 25 will close to prevent air from being injected into the system, and water will continue to flow through the injector 21 free of brine. This water will function to rinse the bed 12 to remove excess brine. Untreated water will be supplied to the service line 27 during this state of operation through the open valve 16.

During the next stage of operation the brine tank 22 is refilled and the softener bed 12 is purged. This is accomplished by opening the service inlet valve 20 and the second service valve 17. Raw water can then enter the brine tank 22 through the open brine valve 23 and can enter the tank 11 through the inlet pipe 14. Water passing through the bed 12 will exit through the drain 19.

The apparatus is returned to a service condition by closing the first service valve 16, the first drain valve 19 and the brine inlet valve 23.

Figure 2:
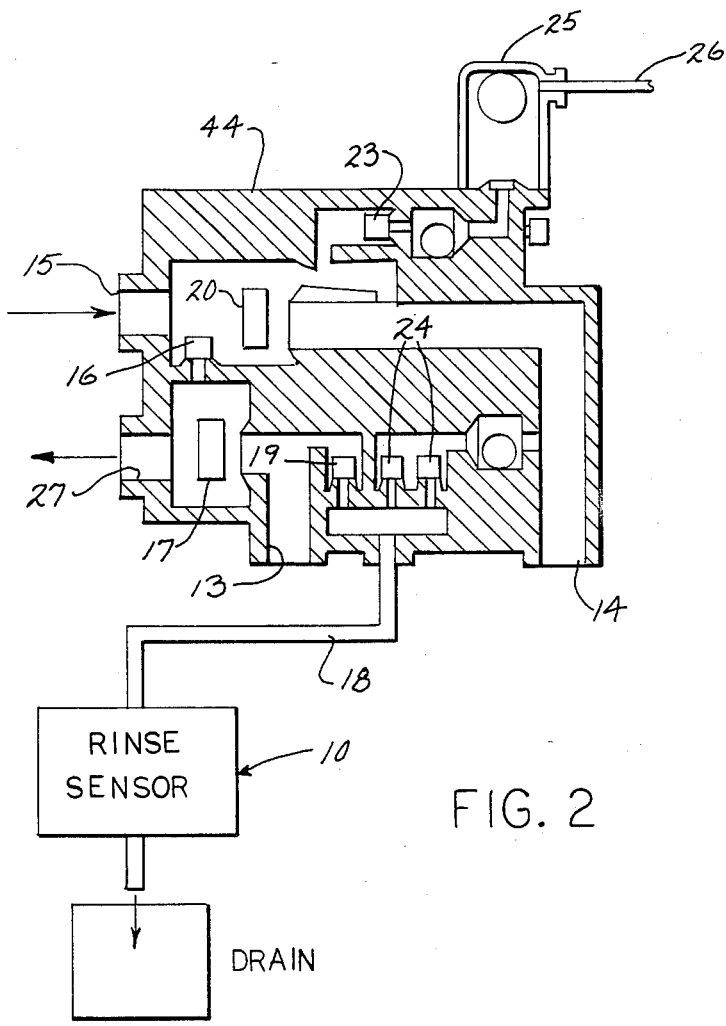
FIG. 2 is a schematic view of an alternative embodiment employing the sensor of this invention.

Referring to FIG. 2, the sensor 10 is employed in conjunction with the drain line 18 and in this instance will sense the rinse water in the rinse cycle. The numbers referred to in FIG. 2 represent the same components as previously explained in conjunction with the FIG. 1 representation. The valves here are merely indicated in a multiway valve unit 44 such as manufactured by *Autotrol Corporation*, Glendale, Wis. under part No. 24N. A further explanation of the sensor 10 as employed in connection with the rinse cycle is set forth in the Operation section to follow.

Figure 3:
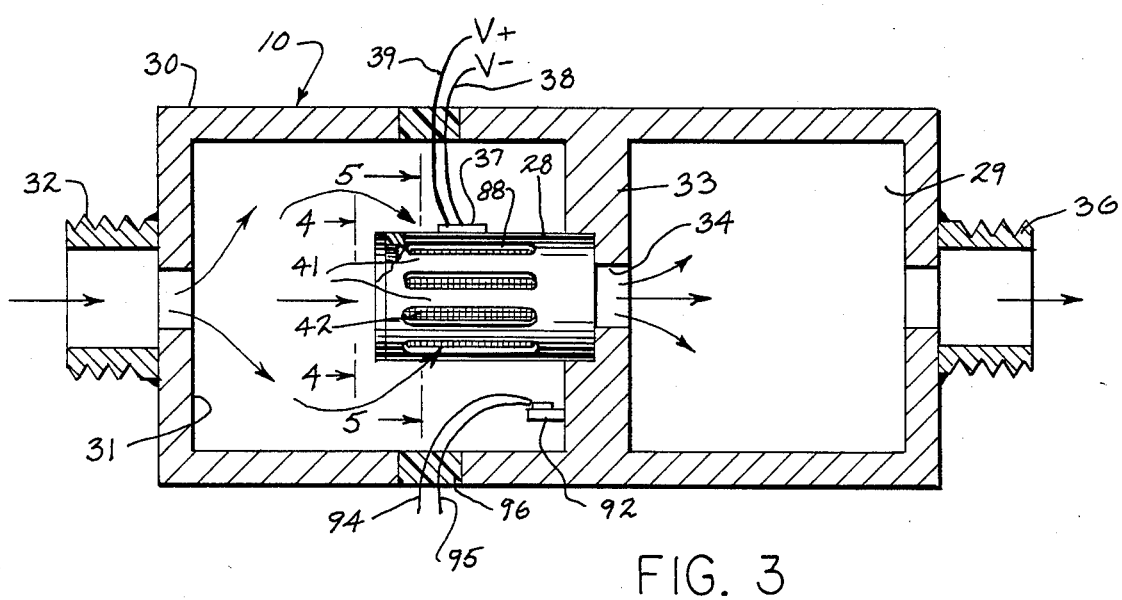
FIG. 3 is a view in side elevation and partially in vertical section illustrating one of the sensors of this invention.
Figure 4:
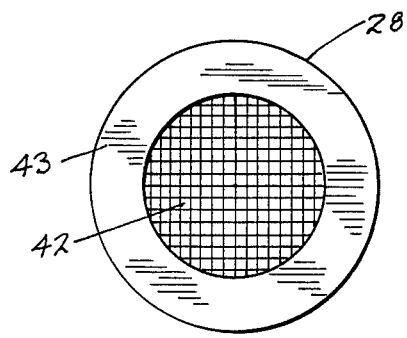
FIG. 4 is a view in vertical section taken along line 4—4 of FIG. 3.
Figure 5:
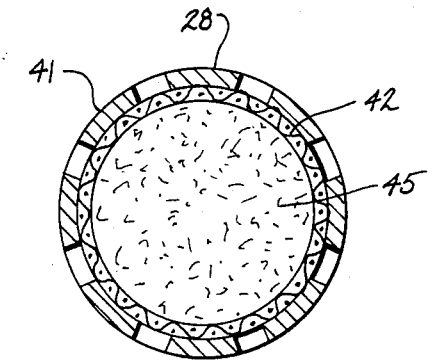
FIG. 5 is a view in vertical section taken along line 5—5 of FIG. 3.

The control of the initiation of the regeneration cycle is accomplished by the use of the sensor generally 10 of this invention. Referring specifically to FIG. 3, the sensor 10 includes a sensor housing 30 having the chambers 31 and 29 separated by a partition 33 with a passage 34 therethrough. A cage member 28 is mounted to the partition 33 in axial alignment with passage 34. It has the spaced ribs 41 with the slots 88 therebetween. The slots 88 are covered with screening 42 to enclose a sample of the ion exchange resin that will put the cage ribs 41 under a high stress condition when in one ionic form (such as Na+ for a softener application) and a low stress condition in another ionic form (such as Ca++ and/or Mg.++ for the same application). The resin is placed in the cage member 28 in a compacted manner. The cage is preferably cylindrical in configuration as seen in FIG. 4 and contains screening 42 at the end of the cage so that sampling water is free to flow into and out of the cage. It will be appreciated that the screening material 42 at the end of the cage 28 will be retained in a cap 43 so that the resin can be placed inside the cage. Secured to one of the ribs 41 is a strain gauge 37 which can be of the wire or foil type or alternatively of the semiconductor type. In the instance of the wire type it will have the usual two lead wires 38 and 39 connected thereto. Referring to FIG. 5, it will be seen that the cell resin 45 is confined in the cage 28. One method of assembly of the sensor is to have the resin in an ionic form that results in a relatively small volume equal to or less than the container volume. For cation resins one such condition would be the resin in equilibrium with NaCl brine. Another method would be to load the resin in the sensor in the dry or semi dry condition. It is surrounded by the screening 42 which in turn is supported by the ribs 41. In order to effect the highest stressed condition for the sensor resin after placement in the cage 28, it is rinsed with soft water such as from softening tank 11. The sensor resin can also be in a brine state or semi dry state and after placement in cage 28 rinsed with soft water. The placement of the sensor resin in the cage is done at the factory. However, the conditioning of the resin can be effected at the factory or in the field of service.

Figure 6:
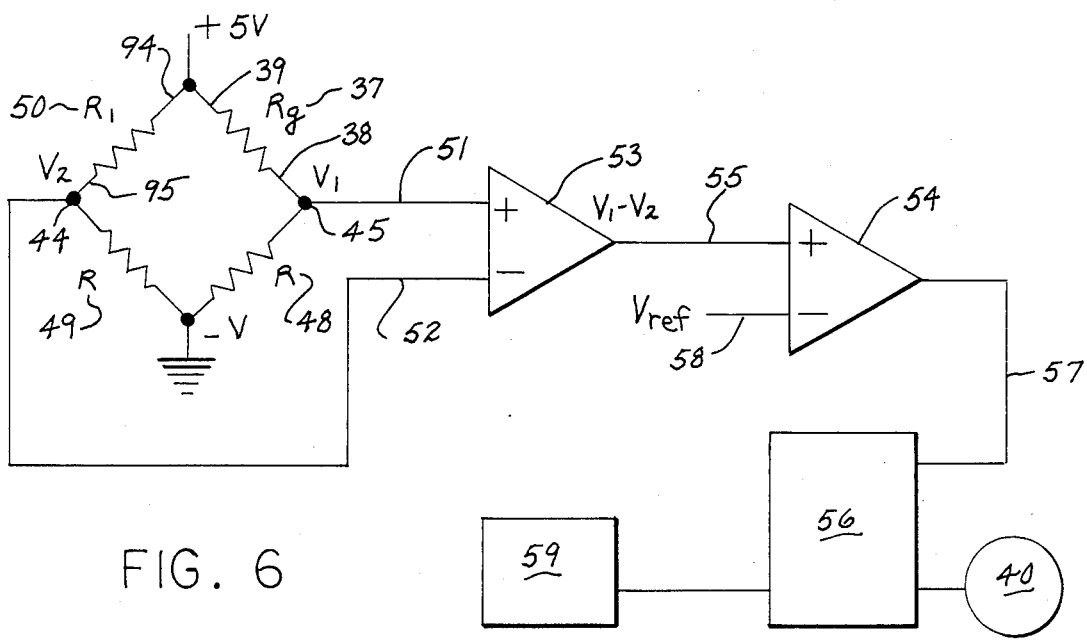
FIG. 6 is a schematic view including a circuit illustrating the sensor of FIG. 3 interconnected to a microprocessor for purposes of initiating regeneration of a water softener.

As best seen in FIG. 6, the strain gauge 37 is interconnected in a Wheatstone bridge arrangement with resistors 48, 49 and 50. An input voltage V of a +5 volts is indicated as well as a negative voltage component-V. The contacts 44 and 45 are interconnected to a differential amplifier 53 by the lines 51 and 52. If desired, and in order to compensate for sudden changes in temperature (such as a surge of cold water) a second strain gauge 92 could be connected to an unstressed piece of the same type of material that composes cage 28. The gauge 92 and the material it is mounted to would be positioned in such a manner so as to experience fluid temperature changes in the chamber 31 thus compensating the bridge output for temperature changes. The bridge output will represent a change in the strain gauge due to a change in the stress on cage 28 from changes in ionic form of the ion exchange resin inside the cage. (See FIG. 3) In this instance, the strain gauge 92 would have the lead wires 94 and 95 connected through insulator 96. It would be represented by resistance $R_1$ or 50 in the Wheatstone bridge. The differential amplifier 53 is in turn interconnected with the comparator 54 by the line 55 which in turn is connected to the voltage reference 58. A microprocessor 56 is connected to the comparator by the line 57 and in turn to a drive motor mechanism 59 and the sensor valve 40. The microprocessor 56 will also be appropriately interconnected through the drive motor mechanism 59 to start a regeneration function in conjunction with the valving such as that previously described in FIG. 1 and particularly those paragraphs immediately following the "Regeneration" heading.

Referring to FIG. 7, there is shown an alternative sensor generally 60 wherein a Bourdon tube 78 is placed in the chamber 66 of housing 61. The Bourdon tube 78 in this case contains a sample of the ion exchange resin 45 such as described in conjunction with the cage 28. The Bourdon tube 78 has an inlet screen section 62 as well as an outlet screen section 63 so as to permit sampling water entering inlet 32 to contact the resin inside the tube 78 as it flows from the inlet screen section 62 to the outlet screen section 63. The outlet screen section 63 is in fluid communication with the outlet passage 64 having the orifice 65, with the outlet passage 64 in communication with the outlet 36. The purpose of the orifice 63 is to create a back pressure so as to nearly equalize the pressure of the water flowing through the tube 78 with the pressure of the water surrounding the tube. A lever 67 is pivotally attached to the Bourdon tube 78 by the pivot 68. A seal member 69 is provided and is retained in the housing 61 by the seal retainer 70 and the screws 71. A contact 72 is slidably positioned by the bracket 77 and the support arm 79. It will have a spring 73 for biasing the contact 72 for contact with the lever 67. The contact 74 is positioned for intermittent contact with the contact 72. The usual electrical feed lines 75 and 76 are connected to the respective slidable contact 72 and stationary contact 74. The engagement of the contacts 72 and 74 is used to signal for a regeneration cycle.

FIG. 8 represents the Bourdon tube in electrical connection with a microprocessor 56 and the sensor valve 40 as well as a drive motor mechanism 59. The contact 72 is shown in an open circuit position with stop 91. To complete the circuit, slidable contact 72 will move to engage contact 74 and ground wire 76.

Referring to FIGS. 9, 10 and 11 alternative embodiments of sensors are shown generally at 80 and 90. Similar numbers indicate similar components as previously described in conjunction with embodiment 60. The major differences in the Bourdon tube 82 in embodiment 80 are that the end of the tube is closed in a solid section 81 and the tube 82 in this instance is slotted along the opposing side walls 88 and 99 such as shown at 84 so as to allow liquid pressure in and out as the liquid flows transversely through the resin from the inlet 32 to the outlet 36 which is positioned with a transverse axis with respect to the inlet 32. It will be apparent that screening such as indicated at 42 could be substituted for the slotted arrangement. In the sensor generally 90, the Bourdon tube 83 having a closed end 87 is also utilized. As best seen in FIG. 11, the inlet 32 and the outlet 36 are axially positioned with the tube 83 having the usual internal passageway 93 communicating with slotted portions 84. The tube end 87 is secured to the base 97. The tube 83 communicates with the U-shaped and arcuate underlying passage 85 formed therein. Radial passages 98 interconnect the passage 85 with the outlet 36. Another difference between embodiment 90 and embodiments 60 and 80 is in the use of a Hall effect switch as represented by switch 100 which can be mounted on the outside of housing 61 and magnet 63 secured to an end of the Bourdon tube 83.

A better understanding of the sensor devices of this invention will be had by a description of the Operation.

Operation

Referring to FIGS. 1, 3 and 6, the sensing of the condition of resin 45 will be initiated by the microprocessor 56 which will be programed to open the sensor valve 40 at a selected time of the day and preferably 2 a.m. At that time, the sensor valve 40 will be opened to allow sampling water from resin bed 12 to pass through the sampling tube 32 which will constitute the inlet into the sensor chamber 31. The water will flow into the cage 28 whereupon it will contact the resin 45 therein. This condition will continue for about 20 minutes. If the water is hard, indicating that the softening bed 12 has been exhausted to the point of the sample tube 35, the cell resin 45 will be partially to fully exhausted and will therefore be in a different ionic state than when it is freshly regenerated. The ionic states for softening applications are Na+ for regenerated and Ca, Mg for exhausted. This different ionic state causes the resin to reduce the stress on the ribs 41. This lessening in force of the resin on the ribs will in turn be sensed by the strain gauge 37, which in turn will impart a voltage through the differential amplifier 53 which will be different than that when the resin is in the regenerated state. In the regenerated state, the resin's ionic conditions (rinsed Na+Form), causes a relatively high force to be exerted on the ribs 41. This will provide a base condition against which a subsequent reduced pressure is compared. This signal will be compared in a comparator 54 which will compare a signal for the base condition with a reduced pressure condition. This signal is in turn fed to the microprocessor 56 through line 57. (See FIG. 6) The microprocessor in turn can send a signal to start the regeneration cycle as earlier described in conjunction with the FIG. 1 illustration. This would be effected such as by appropriate signaling of drive motor 48 as described in U.S. Pat. No. 4,469,602 (which reference should be made) to drive suitable cams to actuate the valves as described therein.

The operation of the sensors 60, 80 and 90 work on the same principle of sensing the degree of hardness by resin pressure forces by the resin in an enclosed area. In this instance the enclosed area for the resin is the Bourdon tubes 78, 82 and 83 which will contain the resin. In the instance where the cell resin 45 is exhausted and reduces internal resin pressure, this in turn will cause the Bourdon tubes 78, 82 and 83 to assume a less expansive state with respect to the distance between the portion having the lever 67 and pivot 68 or the magnet 63 and the fixed end as indicated by the reference numeral 87. Concerning embodiments 60 and 80, movement of the pivot point 68 toward the fixed end 87 as the resin is being exhausted will in turn cause the lever arm 67 to move in a counter clockwise position as viewed in FIGS. 7 and 9. In the instance of the embodiment 60 this will cause the lever 67 to contact the contact 72 compressing spring 73 and contacting contact 72 with contact 74 thus completing a circuit through lines 75 and 76 to effect an electrical signal so as to initiate regeneration. Referring specifically to embodiment 90 the previously indicated movement of the Bourdon tube 83 will also move the magnet 63 toward or away from switch 100 but in a plane parallel thereto to control a circuit through the lines 75 and 76 for the same purpose. As indicated in FIG. 8 the contact 72 for use with the lever arms 67 and the Bourdon tubes 78 and 82 are as shown in a circuit with the microprocessor 56 for initiating regeneration. A sensor valve 40 is also provided for initiating sensing as previously indicated in conjunction with sensor 10. Upon signal for regeneration, drive motor mechanism 59 will cause the multiway valve 44 (see FIG. 2) to regenerate the main treatment bed 12. The Hall effect switch as represented by switch 100 and magnet 63 would be employed in a similar manner. It will be appreciated that although the lever arm 67 is shown in embodiment 60 for contact with an electrical contact, this lever could be utilized without the electrical contact to trip start a regeneration cycle. This would be effected by engagement of a segment gear in the gear train of a timing mechanism which is described and illustrated in the aforesaid U.S. Pat. No. 3,574,330 which reference should be made.

Alternatively, the lever arm 67 could be utilized to contact a hydraulic valve which could initiate a regeneration cycle in a similar manner. The Bourdon tubes 82 and 83 will function in a similar manner as described for tube 78. The differences with respect to the Bourdon tube 82 is in that this tube is either slotted or screened in a lateral manner throughout its entire length in contrast to the screened section of tube 78. With respect to Bourdon tube 83 the difference between it and the previous Bourdon tubes is in the axial alignment of the inlet and the outlet of the sampling tubes and the connection of the outlet tube 36 to outlet passages in a base portion 97. Bourdon tubes 82 and 83 offer the advantage over Bourdon tube 78 in permitting faster contact of the resin with the sampling liquid.

The strain gauge 37 offers the advantage over the Bourdon tube embodiments in having no moving parts. It should be recognized, that whether the sensor 10 using the strain gauge 37 or the Bourdon tube of which Bourdon tube 78 is representative, that the sensors of this invention differ from those previously employed in that they do not measure the mere volume of expansion or contraction of a resin bed as it becomes exhausted or is regenerated. Instead, the sensors of this invention measure the pressure of the resin as it is exerted on the container for the resin in an enclosed volume. This allows the use of resins with higher quantities of divinyl benzene than previously used in sensors (2.6%-4%). The preferred resin will have a divinyl benzene content of 6% or higher which have lower rates of degradation under oxidation conditions and are usually physically stronger than lower cross linked resins such as those having a divinyl benzene content of 4% or lower. Further, the use of a strain gauge or a Bourdon tube in place of a mechanical plunger to sense resin volume obviates the problems with mechanical plungers in that they can become inoperative by foreign matter accumulating along the slide path of the plunger. This could be caused by foreign material in the surrounding environment or oxidation of the plunger material and the surrounding guide surfaces. Sensors of the type described herein also eliminate the utilization of flexible diaphrams commonly employed with plunger type resin sensing devices. These can also be sensitive to fatigue to result in their becoming inoperative after long periods of use.

Another important feature of this invention is the fact that the sensors of this invention lend themselves to various types of resin regeneration procedures whether initiated electrically, mechanically or hydraulically. While the sensors of this invention also can be easily controlled by the use of the microprocessor, this is not necessary as a simple timing clock could be utilized in conjunction with an electrical circuit interconnected with the lead wires 75 and 76 which would cause a regeneration circuit to close when the contacts 72 and 74 engage. The sensors could be used with a clock which would close the circuit by a simple switch.

The sensors of this invention have been illustrated for use in connection with an ion exchange bed 12 and water softening. As indicated in FIG. 2, the sensor can be employed in connection with rinse water sensing as a means of determining when regeneration of the resin is completed thus resulting in a saving of rinse water. In this instance the ion exchange resin is not undergoing a change in ionic form. Instead the resin when in equilibrium with high concentrations of sodium chloride brine will place in the instance of sensor 10 low stress on cage 28 (resin volume shrinks in the brine). When a high concentration of sodium chloride brine is rinsed out of the cage 28, the resin is in equilibrium with the surrounding rinse water and this places a high stress on the cage 28 as the resin would be fully swollen if not in the cage. This change of stress is detected by the strain gauge 37. If desired, the sensors 60, 80 and 90 could be similarly employed in the manner previously indicated in conjunction with rinse water sensing.

The sensors have been particularly described in conjunction with water softening. They can also be advantageously employed with a water deionizing system. When employed in an ion exchange capacity the resin in the sensor will sense non H+ions in a cation exchange tank of a 2 bed deionizing system which in turn causes a reduced stress for example on the cage 28. The sensor resin can also sense non OH−ions in an anion exchange tank of a 2 bed deionizing system which in turn causes a change in the stress on the cage 28. In a manner similar to the before-mentioned water softening operation, the sensors of this invention are also operable in connection with the rinse water sensing in a deionizing system. For example, during acid regeneration such as with hydrochloric or sulfuric acid, the cation resin when in equilibrium with the acid regenerant exerts a low stress on the cage 28; when rinsed it exerts high stress. During regeneration of the anion resin with sodium hydroxide solution, the cage 28 undergoes a change in stress from low to high as the resin is rinsed. When the Bourdon tubes 78, 82 or 83 are employed the same resin pressure conditions would be detected.

The sensors have been described in conjunction with systems where the sensing has been conducted on an intermittent basis. The sensors lend themselves to a continuous sensing system as well. For example, the sensors 10, 60, 80 or 90 would be connected in line with the sample tube 32. However the sample tube 32, would be connected in a parallel manner with respect to outlet tube 13 which also would be in fluid communication with the service valve 17. Thus, whenever there is a service flow, a sample would flow through the sensor. When the sensor detects hard water, a regenerative mode can be signalled immediately or at a preset time as previously indicated with reference to the various regenerative initiation mechanisms.

Figure 13:
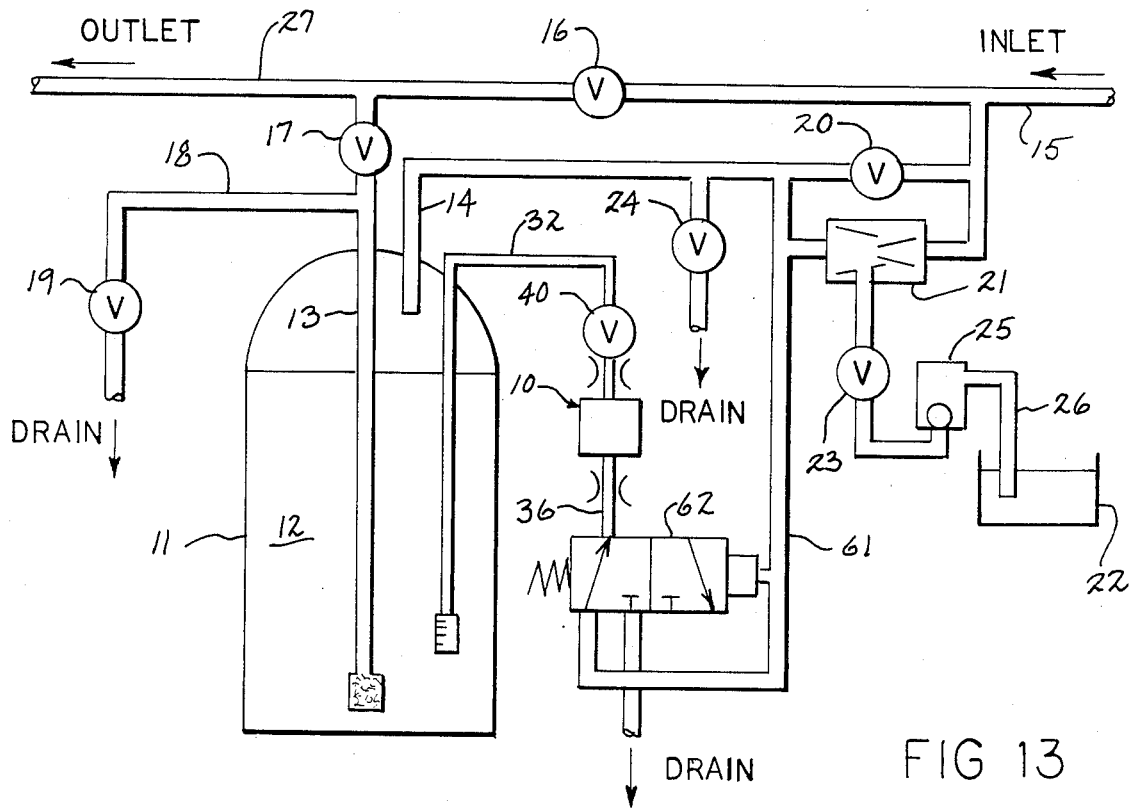
FIG. 13 is a view similar to FIG. 1 showing still another embodiment of a sensor.

The Bourdon tubes 78, 82 or 83 have been illustrated in conjunction with sampling tube 32. If desired, they, as well as the strain gauge, could be employed in the foregoing manner and in a sensing cell as represented by sensor 10 which is connected directly to a source of brine fluid. This is described in conjunction with FIG. 13. Similar components are designated by the same numbers as described in FIG. 1. The advantages of placing the sensor 10 in direct communication with brine tank 22 through three-way valve 62 is described and illustrated in the aforesaid U.S. Pat. No. 4,385,992 which reference should be made.

Figure 12:
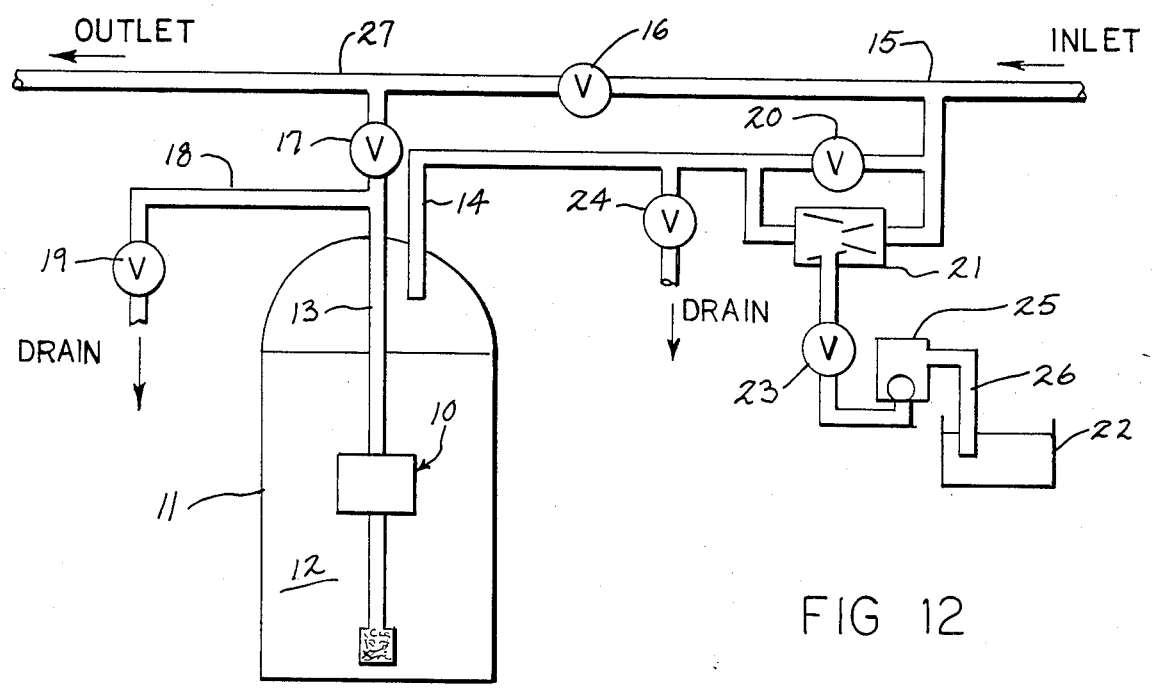
FIG. 12 is a view similar to FIG. 1 illustrating yet another embodiment of a sensor.

The sensing devices have been described for use outside the softening tank 11 and the resin bed 12. If desired the Bourdon tubes 78, 82 and 83 or the cage 28 with the resin sample therein could be placed directly in the resin bed 12 inside the softening tank 11. This is illustrated in FIG. 12 where similar components are designated with the same numbers with respect to FIG. 1. It will be seen that the sensor as represented by the sensor 10 is in fluid communication with outlet tube 13. This arrangment would eliminate additional fluid connection to these sensors. The electrical connections to the regeneration circuit could be made from the switches, such as represented by the contacts 72 and 74 or the Hall effect switch (63, 100), also placed in the tank 11 to the outside thereof by the connecting wires 75 and 76. (See FIG. 7.) The strain gauge 37 and cage 28 could be placed in the resin bed 17 in a like manner.

The Bourdon tube embodiments 78, 82 and 83 lend themselves more readily for use with the deionizing system. This is due to their fabrication including the materials from which they are manufactured. They are more tolerant of acid and caustic conditions. However the cage 28 could also be advantageously utilized in this system with the selection of proper materials and fabrication techniques.

The sensors of this invention also offer the advantage of equalizing water pressure differentials inside and outside of the receptable means for the resin. With respect to the cage 28 or the Bourdon tubes 78, 82 and 83, it is seen that they are enclosed in fluid compartments 31 or 66. This allows for the inlet water pressure to equalize with the water pressure inside the cage or the Bourdon tubes and thereby eliminate it as a pressure factor to be considered in determining resin pressure. In the instance of the cage 28 and the Bourdon tubes 82 and 83 the screening or the slots 84 will also allow for free flow of water in and out of the cage or the tubes. In the case of the Bourdon tube 78 which is not completely slotted, the pressure compensating is effected by the force of inlet water on the outside of the tube which will approximately equal that on the inside caused by the back pressure of orifice 65.

In the foregoing description the term resin pressure has been employed. This term means the force that the resin beads or particles place on the receptable cage 28 or Bourdon tubes 78, 82 and 83 by directly impinging thereon. Resin pressure changes as the ionic state of the resin changes. It will be appreciated that the smaller the resin particles the more closely the resin pressure simulates fluid pressure.

The Bourdon tubes 78, 82 and 83 have been preferably illustrated as in an arcurate configuration. If desired they could be of other well known geometric configurations such as a spiral or circular form.

I claim:

1. An automatic sensor for a liquid treatment device wherein resin presure is measured as an indication of a change of condition of the liquid comprising in combination:

a liquid treatment container for receiving said liquid;

a first quantity of regenerable ion exchange resin contained in said container for contact with said liquid for changing a condition of said liquid;

a second quantity of regenerable ion exchange resin in fluid communication with said first quantity of ion exchange resin;

receptacle means to confine said second quantity of ion exchange resin in an enclosed volume so that any attempted expansion in volume of said resin is restrained in all directions and liquid pressure is free to act inside as well as outside said receptacle means, said second quantity of regenerable ion exchange resin exerting a certain stress upon said receptacle means in one ionic or equlibrium condition and different stress upon said receptacle means in another ionic or equilibrium condition; and pressure sensor means operatively associated with said receptacle means to provide a mechanical or electrical effect varying in accordance with the resin pressure acting on the receptacle means to effect a force caused by a change of condition by the resin.

2. The automatic sensor as defined in claim 1 wherein said pressure sensor means is defined by a strain gauge.

3. The automatic sensor as defined in claim 2 wherein said receptacle means is defined by a container composed of slotted or screened walls and substantially rigid ribs.

4. The automatic sensor as defined in claim 2 further including circuit means connected to said pressure sensor, said circuit means interconnected to means to trigger an output for regenerating said ion exchange resin in said liquid treatment container and said receptable means when said pressure sensor registers a predetermined state of condition of said liquid.

5. The automatic sensor as defined in claim 1 wherein said pressure sensor means and said receptacle means is a multiapertured Bourdon tube.

6. The automatic sensor as defined in claim 5 wherein said Bourdon tube is connected to an arm member for engagement with a switch.

7. The automatic sensor as defined in claim 5 wherein said Bourdon tube is operatively associated with a Hall effect switch.

8. The automatic sensor as defined in claim 1 wherein said pressure sensor is located outside of said liquid treatment container and is connected thereto by a liquid carrying conduit.

9. The automatic sensor as defined in claim 8 wherein said liquid carrying conduit is in communication with said receptacle means by a valved sampling tube.

10. The automatic sensor as defined in claim 9 wherein said receptacle means is in direct communication with a brine source.

11. The automatic sensor as defined in claim 8 wherein said liquid carrying conduit is connected to valving means which controls the rinse cycle and said pressure sensor is mounted in fluid commuication with said drain conduit so as to sense the rinse water.

12. The automatic sensor as defined in claim 1 wherein said pressure sensor is located inside the fluid treatment container.

13. An automatic sensor for a liquid treatment device wherein resin pressure is measured as an indication of a change of condition of the liquid comprising in combination:
a liquid treatment container for receiving said liquid;
a first quantity of regenerable ion exchange resin contained in said container for contact with liquid for changing a condition of said liquid;
a second quantity of regenerable ion exchange resin in fluid communication with said first quantity of ion exchange resin;
receptacle means to confine said second quantity of ion exchange resin in an enclosed volume so that any attempted expansion in volume of the resin is restrained in all directions, said second quantity of regenerable ion exchange resin exerting a certain stress upon said receptacle means in one ionic or equilibrium condition and different stress upon said receptacle means in another ionic or equilibrium condition;
a liquid compartment for said liquid with said receptacle means operatively positioned therein, said receptacle means being placed under the influence of pressure of said liquid in said liquid compartment; and
pressure sensor means operatively associated with said receptacle means to provide a mechanical or electrical effect varying in accordane with the ion exchange resin pressure.

14. A pressure sensor device to sense a change in the condition of a resin wherein resin pressure is measured as an indication of a change of condition of a liquid comprising:
receptacle means containing a quantity of resin in an enclosed volume so that any attempted expansion in volume of said resin is restrained in all directions, said resin exerting a certain stress upon said receptacle means in one ionic or equilibrium condition and a different stress upon said rceptacle means in another ionic or equilibrium condition;
a compartment for liquid with said receptacle means operatively positioned therein, said receptacle means being placed under the influence of pressure of said liquid in said compartment; and
a pressure sensor operatively associated with said receptacle means for exposure to the pressure of the resin within said receptacle means to sense a change of condition varying in accordance with a force on the receptacle means caused by a change of condition by the resin and to provide a further effect.

15. The pressure sensor device as defined in claim 14 wherein said pressure sensor is defined by a strain gauge.

16. The pressure sensor device as defined in claim 15 wherein said receptacle means is defined by a container composed of screened or slotted walls.

17. The pressure sensor device as defined in claim 14 wherein said pressure sensor and said receptacle is a multi-apertured Bourdon tube.

18. A Bourdon tube device for sensing resin pressure as an indicator of the condition of a resin and the change of condition of a liquid while compensating for liquid pressure comprising:
a multiapertured Bourdon tube containing a quantity of resin, said multiapertured Bourdon tube constructed and arranged to allow a liquid to pass into said Bourdon tube for contact with said resin as well as out of said Bourdon tube with an increase or decrease of said resin pressure being effected by said liquid, said resin exerting a certain stress upon said Bourdon tube in one ionic or equilibrium condition and a different stress upon said Bourdon tube in another ionic or equilibrium condition;
a compartment for said liquid with said Bourdon tube operatively positioned therein, said Bourdon tube being placed under the influence of the pressure of said liquid in the compartment; and
signal indication means operatively associated with said Bourdon tube to indicate a movement thereof.

19. The Bourdon tube device of claim 18 wherein said signal means to indicate movement thereof is a pivotal lever arm.

20. The Bourdon tube device of claim 19 further including electrical contact means operatively positioned for contact with said lever arm.

21. The Bourdon tube device of claim 18 wherein said multiapertured Bourdon tube is defined by slots or screening extending over the length thereof.

22. The Bourdon tube device of claim 18 wherein said Bourdon tube includes a liquid passage means having an outlet passageway.

23. The Bourdon tube device of claim 18 wherein said compartment includes liquid inlet and outlet passages and said liquid inlet and outlet passages and said multi-apertures of said Bourdon tube are constructed to accommodate the passage of water.

24. The Bourdon tube device of claim 18 wherein said Bourdon tube is of a generally arcurate configuration.

* * * * *